(12) United States Patent
Chen (10) Patent No.: US 7,555,189 B2
(45) Date of Patent: Jun. 30, 2009

(54) OPTICAL DEVICE CLEANING

(75) Inventor: David Z. Chen, Richardson, TX (US)

(73) Assignee: Verizon Services Organization Inc., Irving, TX (US)

( * ) Notice: Subject to any disclaimer, the term of this patent is extended or adjusted under 35 U.S.C. 154(b) by 26 days.

(21) Appl. No.: 11/674,763

(22) Filed: Feb. 14, 2007

(65) Prior Publication Data

US 2008/0193095 A1    Aug. 14, 2008

(51) Int. Cl.
*G02B 6/00* (2006.01)
*A47L 5/14* (2006.01)

(52) U.S. Cl. .................... 385/134; 385/147; 15/319
(58) Field of Classification Search ............... None
See application file for complete search history.

(56) References Cited

U.S. PATENT DOCUMENTS

| | | | |
|---|---|---|---|
| 5,581,644 A * | 12/1996 | Saito et al. | 385/17 |
| 6,839,935 B2 * | 1/2005 | Kiani et al. | 15/345 |
| 7,356,236 B1 * | 4/2008 | Huang et al. | 385/134 |

FOREIGN PATENT DOCUMENTS

JP      02125210 A  *  5/1990

OTHER PUBLICATIONS

"FiberZone Networks—Lighting the Fiber Infrastructure: Automated Fiber Management", FiberZone Networks, print date Feb. 9, 2007.
"FiberZone Unveils Automated Fiber Management Product Suite", FiberZone Networks, copyright 2005.

\* cited by examiner

*Primary Examiner*—Omar Rojas (57) ABSTRACT

An optical device may include first and second male connectors and a patch panel that includes through holes for interconnecting the first male connectors and the second male connectors. The optical device may also include a patch panel cleaner to automatically clean the through holes of the patch panel, and a connector cleaner to automatically clean the first male connectors or the second male connectors.

16 Claims, 8 Drawing Sheets

OPTICAL DEVICE CLEANING

BACKGROUND

Some optical switches permit any-to-any connections. In this case, the optical switch connects one of several male fiber connectors to one of several female fiber connectors. Proper cleaning of the optical switch continues to be an issue faced by optical switch manufacturers and users.

Any contamination in the fiber connection can greatly degrade performance or cause the optical switch to fail. Mechanical dust can occur due to the rubbing and/or touching that often occurs when mating two fiber connectors together. Even microscopic dust particles can cause a variety of problems for optical connections. A particle that partially or completely blocks a fiber core can generate strong back reflections that can cause instability in the optical switch. Dust particles trapped between two fiber faces can scratch the glass surfaces, which can lead to high decibel (dB) loss. Even if a particle is only situated on a cladding or an edge of the fiber face, it can cause an air gap or a misalignment between the fiber cores, which can significantly degrade the optical signal.

In addition to dust, other types of contamination can also accumulate on fiber connectors. Examples of these types of contamination include oils (e.g., frequently from human hands), residues (e.g., condensed air vapors), and powdery coatings (e.g. left after water or other solvents evaporate). These contaminants can be more difficult to remove than dust particles and can also cause damage to the optical switch if not removed.

Manual techniques exist for fully cleaning male fiber connectors, but such techniques often are insufficient for properly cleaning female fiber connectors. Blowing or sucking tools have been used to clean dust particles from within a female fiber connector, but these tools may have insufficient strength to overcome the high static forces that can occur within the female connector. A swab can be used to clean other types of contaminants from within a female connector, but the swab typically cannot fully eliminate the contaminants.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide an arrangement for an optical device that ensures that the device can be properly and automatically cleaned.

Figure 1:
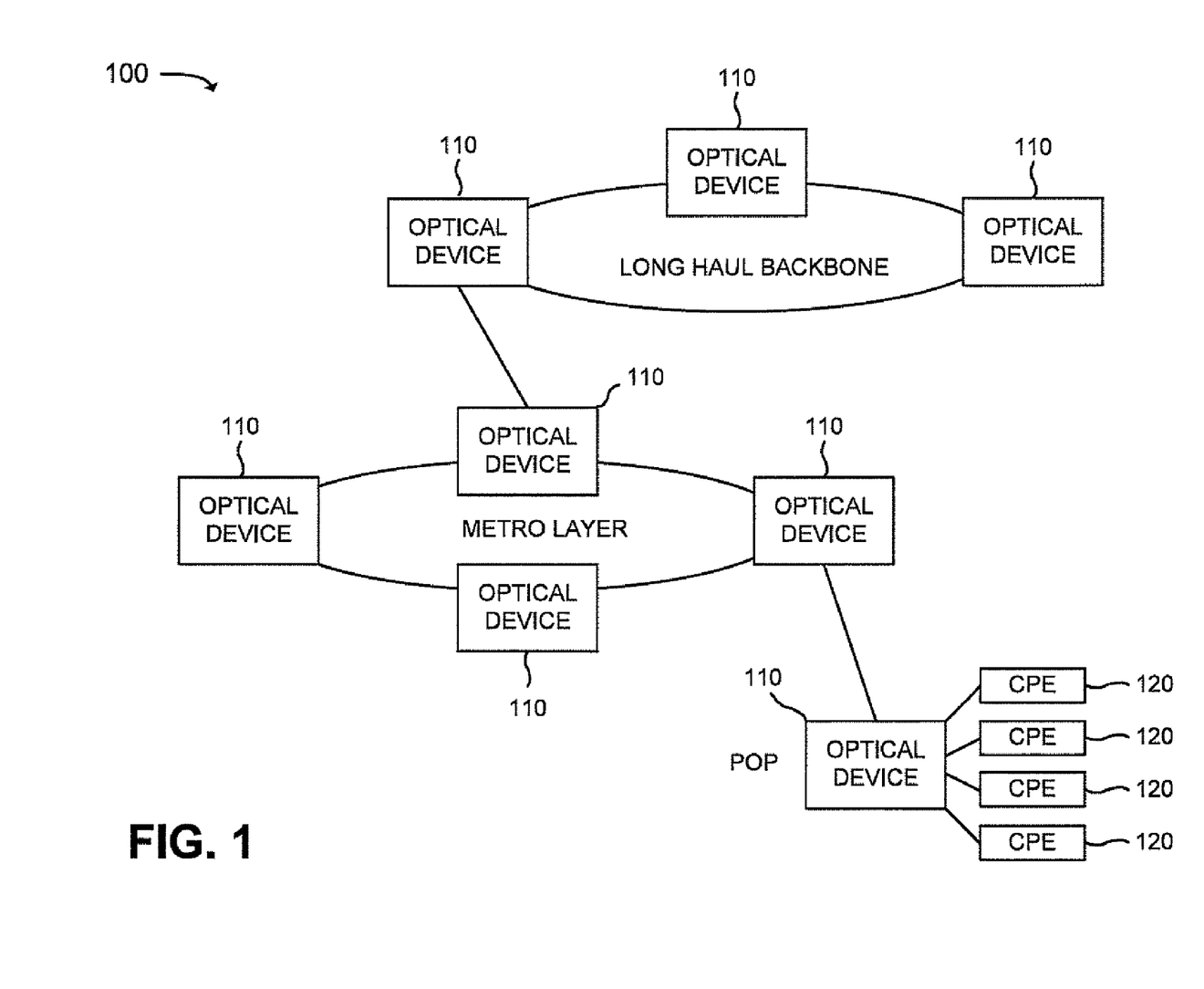
FIG. 1 is a diagram of an exemplary network in which systems and methods described herein may be implemented.

FIG. 1 is a diagram of an exemplary network 100 in which systems and methods described herein may be implemented. Network 100 may include optical devices 110 arranged to form one or more networks. In other implementations, other arrangements of optical devices 110 are possible.

Optical device 110 may include an optical switch, an optical patch panel system, or the like. Optical device 110 may provide any-to-any connectivity from one set of optical fibers to another set of optical fibers. Optical devices 110 may connect together to form a long haul backbone or a metro layer. Alternatively, optical device 110 may form a point-of-presence (POP) that connects to customer premises equipment (CPE) 120.

Figure 2:
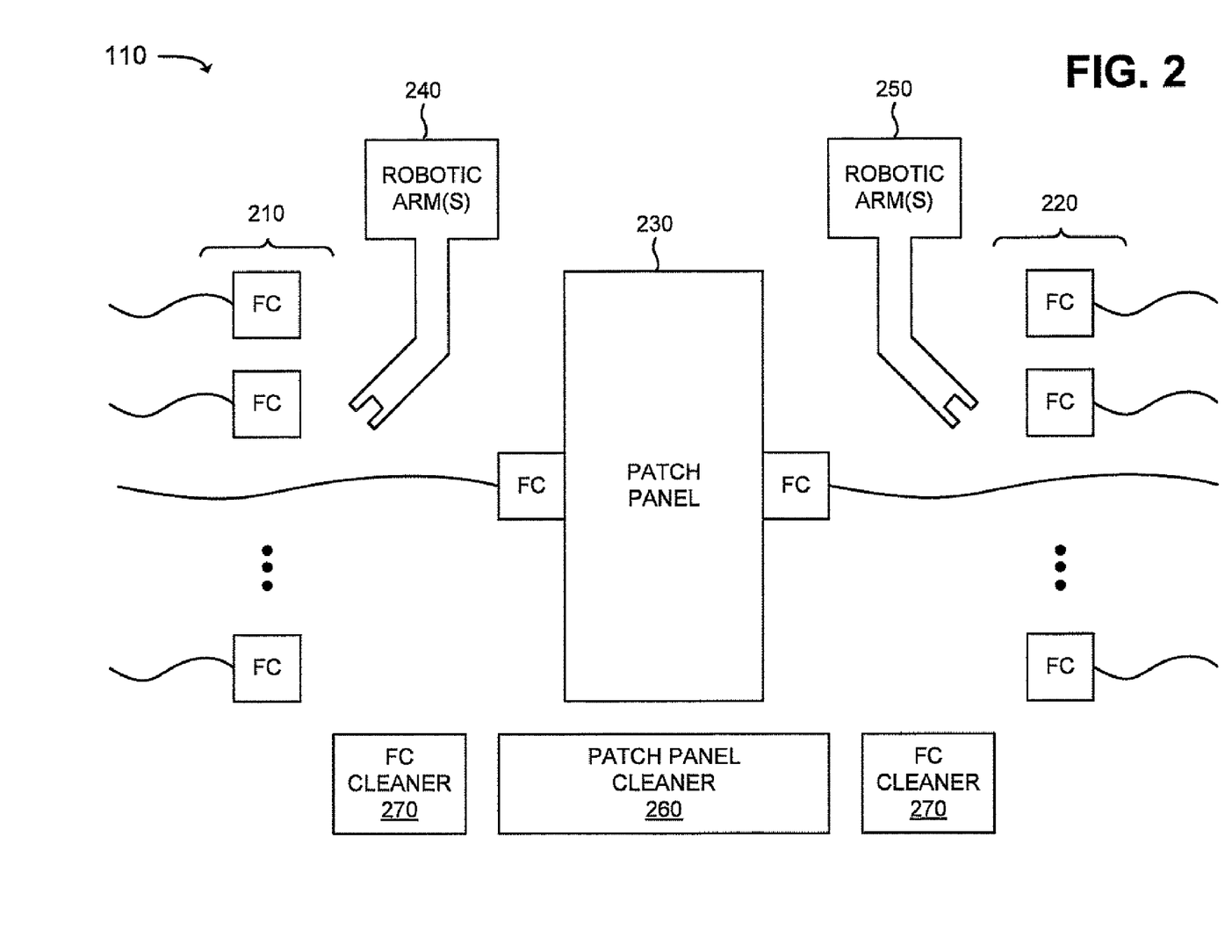
FIG. 2 is an exemplary diagram of a portion of an optical device of FIG. 1.

FIG. 2 is an exemplary diagram of a portion of optical device 110. Optical device 110 may include fiber connectors 210 and 220, a patch panel 230, robotic arms 240 and 250, a patch panel cleaner 260, and a fiber connector cleaner 270. While a certain number and arrangement of components are shown in FIG. 2, a different number or arrangement of components may be used in other implementations. For example, optical device 110 may include a controller (not shown) that may control the operation of the various components shown in FIG. 2.

Figure 3:
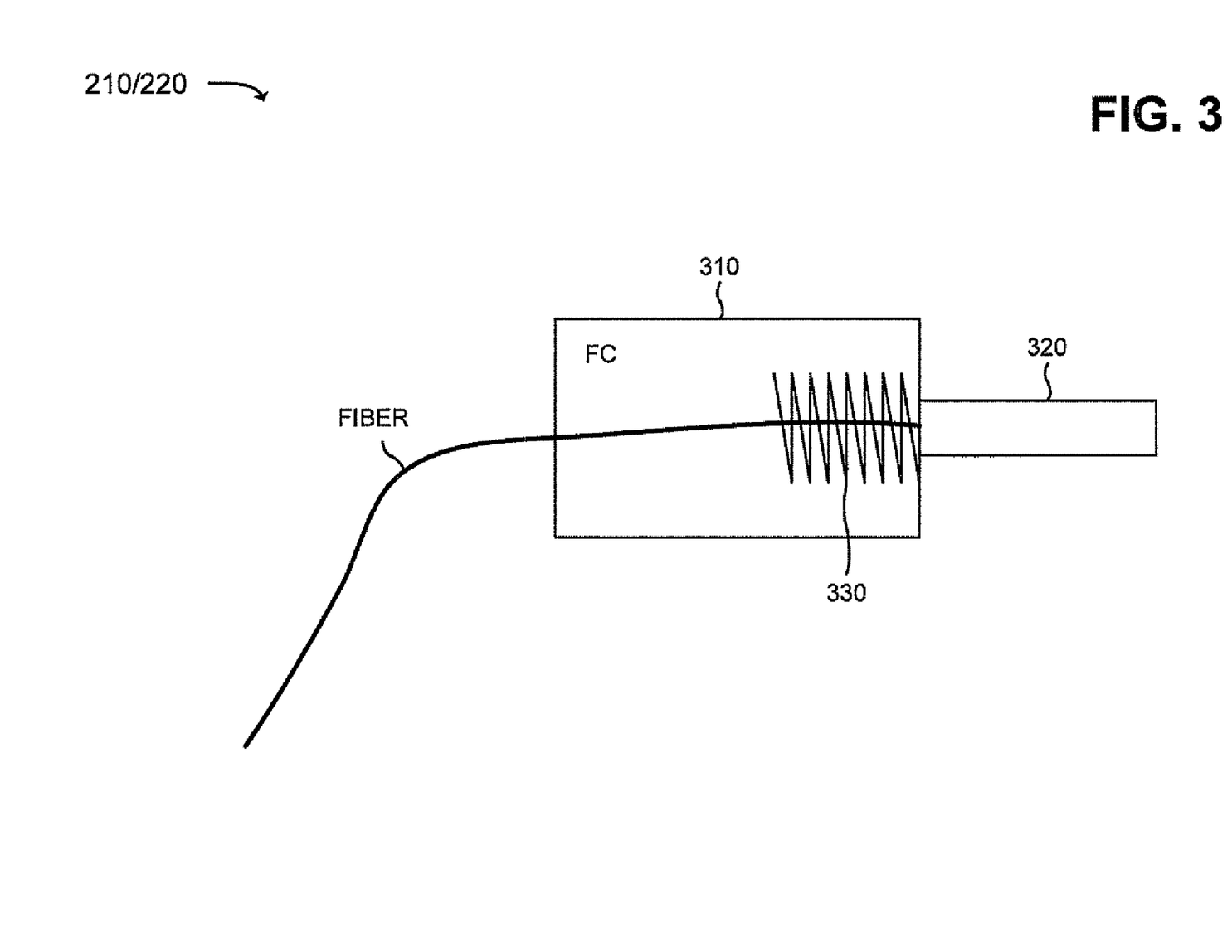
FIG. 3 is an exemplary diagram of a fiber connector of FIG. 2.

Fiber connectors 210 and 220 may include male connectors that connect to optical fibers. A single fiber connector 210 or 220 may receive and/or transmit data on its corresponding optical fiber. FIG. 3 is an exemplary diagram of a single fiber connector 210 or 220 (also referred to herein as "fiber connector 210/220"). Fiber connector 210/220 may include a housing 310 and a fiber tip 320. Housing 310 may be constructed of a rigid material like plastic and/or rubber. Housing 310 may receive an optical fiber and connect the fiber to fiber tip 320. Fiber tip 320 may be constructed of a rigid material to protect the optical fiber. Housing 310 may also include a spring 330 that is designed for forced contact to prevent high loss.

Returning to FIG. 2, patch panel 230 may include a housing that facilitates cross connections between fiber connectors 210 and fiber connectors 220. As shown in FIG. 2, a fiber connector 210 may connect to one side of patch panel 230 and a fiber connector 220 may connect to the other side of patch panel 230. While FIG. 2 shows fiber connectors 210 and 220 connecting to patch panel 230 in a horizontal manner, fiber connectors 210 and 220 may connect to patch panel 230 in a vertical manner.

Figure 4:
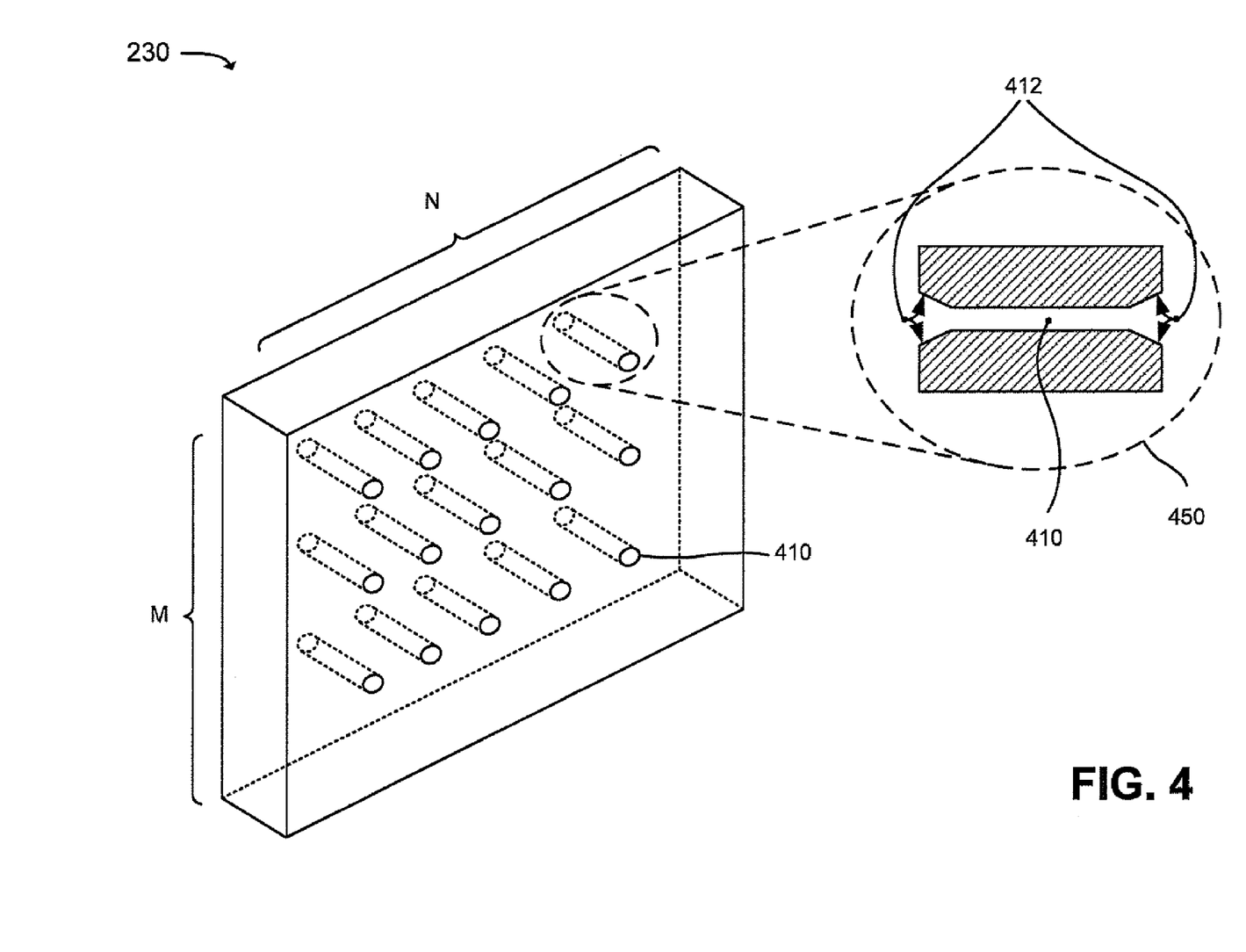
FIG. 4 is an exemplary diagram of a patch panel of FIG. 2.

FIG. 4 is an exemplary diagram of patch panel 230. As shown in FIG. 4, patch panel 230 may include a plastic housing with M×N through holes 410 (where M≧1, N≧1). Each through hole 410 may be configured to support fiber tips 320 of one fiber connector 210 and one fiber connector 220. Through hole 410 may facilitate the transmission of optical signals between these fiber connectors 210 and 220 with low loss. Patch panel 230 may assure that latching remains and no connectivity is lost in the event that power is removed from optical device 110.

Circular area 450 in FIG. 4 illustrates a cross-section of patch panel 230. As shown within circular area 450, each through hole 410 may include angled slants 412 on either side of patch panel 230. Angled slants 412 may be designed to facilitate proper guiding of fiber connectors 210 and 220.

Returning to FIG. 2, robotic arm(s) 240 or 250 may include one or more mechanical mechanisms to facilitate the connection of a fiber connector 210 or 220 to patch panel 230. As used herein, the term "robotic arm" is to be broadly interpreted to mean any mechanical mechanism that can operate under software control. Robotic arm 240 or 250 may obtain a fiber connector 210 or 220, guide fiber connector 210 or 220 to a particular through hole 410 of patch panel 230, and tightly seat fiber connector 210 or 220 with patch panel 230.

Patch panel cleaner 260 may include one or more automated mechanisms that can be used for cleaning through holes 410 of patch panel 230. Patch panel cleaner 260 may use these automated mechanisms to clean through holes 410 if through holes 410 are empty (i.e., if through holes 410 are not being used to mate fiber connectors 210 and 220).

Figure 5:
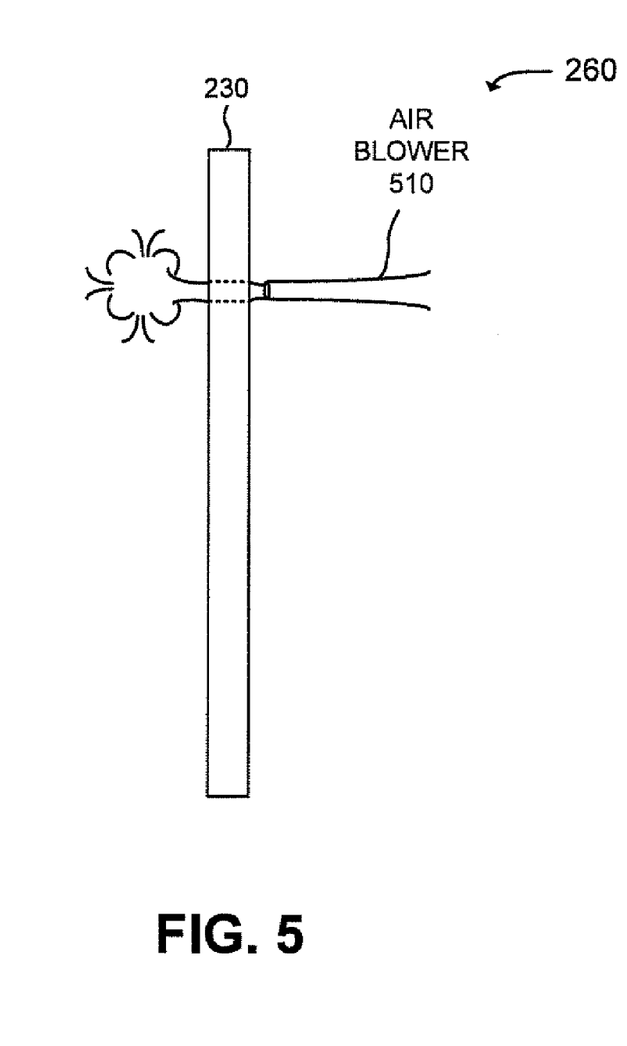
FIGS. 5 and 6 are exemplary diagrams of a patch panel cleaner of FIG. 2.
Figure 6:
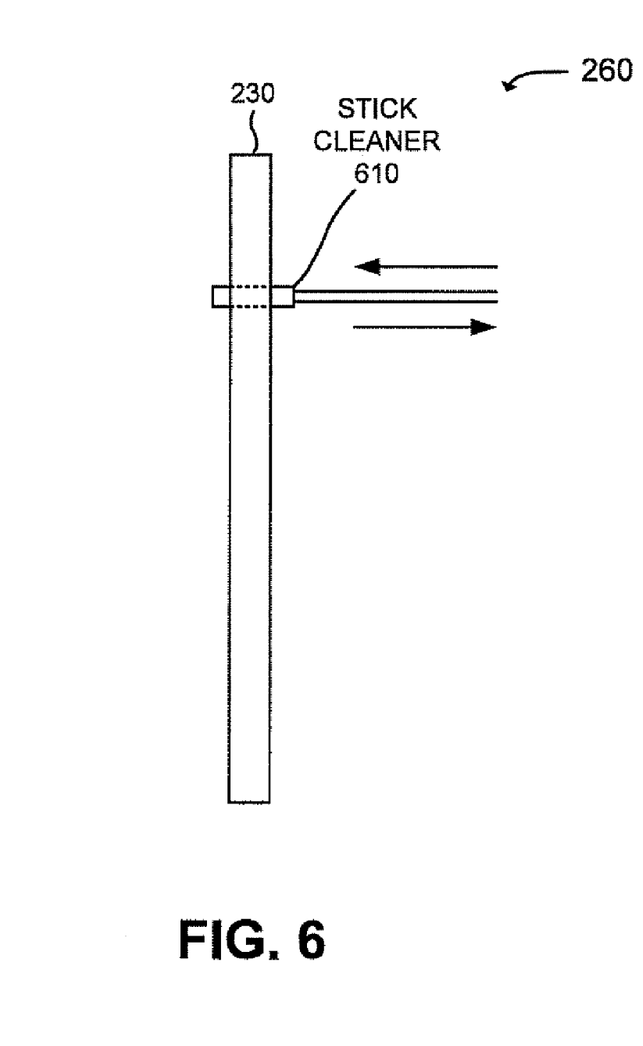

FIGS. 5 and 6 are exemplary diagrams of patch panel cleaner 260. As shown in FIG. 5, patch panel cleaner 260 may include an air blower 510 to blow air through a through hole 410 to remove any contaminants contained therein. The amount of force of the air blown by air blower 510 may be programmable. A robotic arm (not shown) can be used to move air blower 510 to a through hole 410 to be cleaned. The robotic arm may operate under software control. As shown in FIG. 6, patch panel cleaner 260 may include a stick cleaner 610 to be inserted into a through hole 410 to remove any contaminants contained therein. A robotic arm (not shown) can be used to insert stick cleaner 610 into a through hole 410 to be cleaned. The robotic arm may operate under software control. The direction and/or motion that stick cleaner 610 moves can be programmable. For example, stick cleaner 610 may be moved in a back and forth direction, as shown in FIG. 6, and/or may be moved in a circular motion once inserted into through hole 410.

Returning to FIG. 2, fiber connector cleaner 270 may include one or more automated mechanisms that can be used for cleaning fiber connectors 210 and 220. Fiber connector cleaner 270 may use these automated mechanisms to clean fiber connectors 210 and 220 if fiber connectors 210 and 220 are not being used (i.e., if fiber connectors 210 and 220 are not currently mated in a through hole 410).

Figure 7:
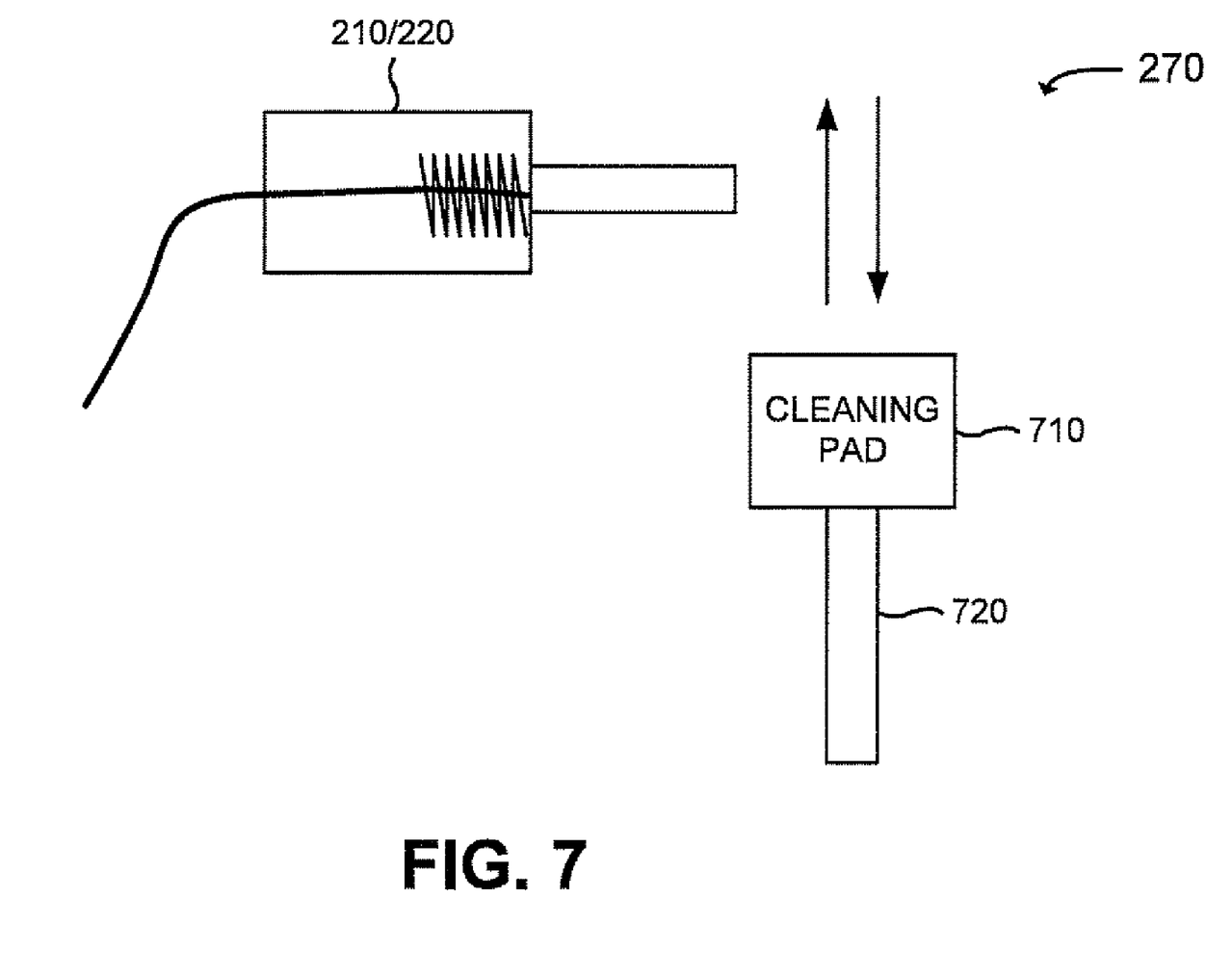
FIG. 7 is an exemplary diagram of a fiber connector cleaner of FIG. 2.

FIG. 7 is an exemplary diagram of fiber connector cleaner 270. As shown in FIG. 7, fiber connector cleaner 270 may include a cleaning pad 710 connected to a robotic arm 720. Cleaning pad 710 may include a cleaning material suited for cleaning the fiber tips of fiber connectors. Cleaning pad 710 may provide dry or wet cleaning. Robotic arm 720 may move cleaning pad 710 to a fiber connector 210/220 to be cleaned. Robotic arm 720 may operate under software control. In one implementation, robotic arm 720 may use a motion perpendicular to the axis of fiber tip 320 of fiber connector 210/220 to clean contaminants from fiber connector 210/220. Robotic arm 720 may repeat the perpendicular motion for a number of iterations or until fiber connector 210/220 is determined to be clean (e.g., when the loss associated with fiber connector 210/220 falls under a threshold, which may or may not be the same as the threshold used to determine when to clean fiber connector 210/220).

Figure 8:
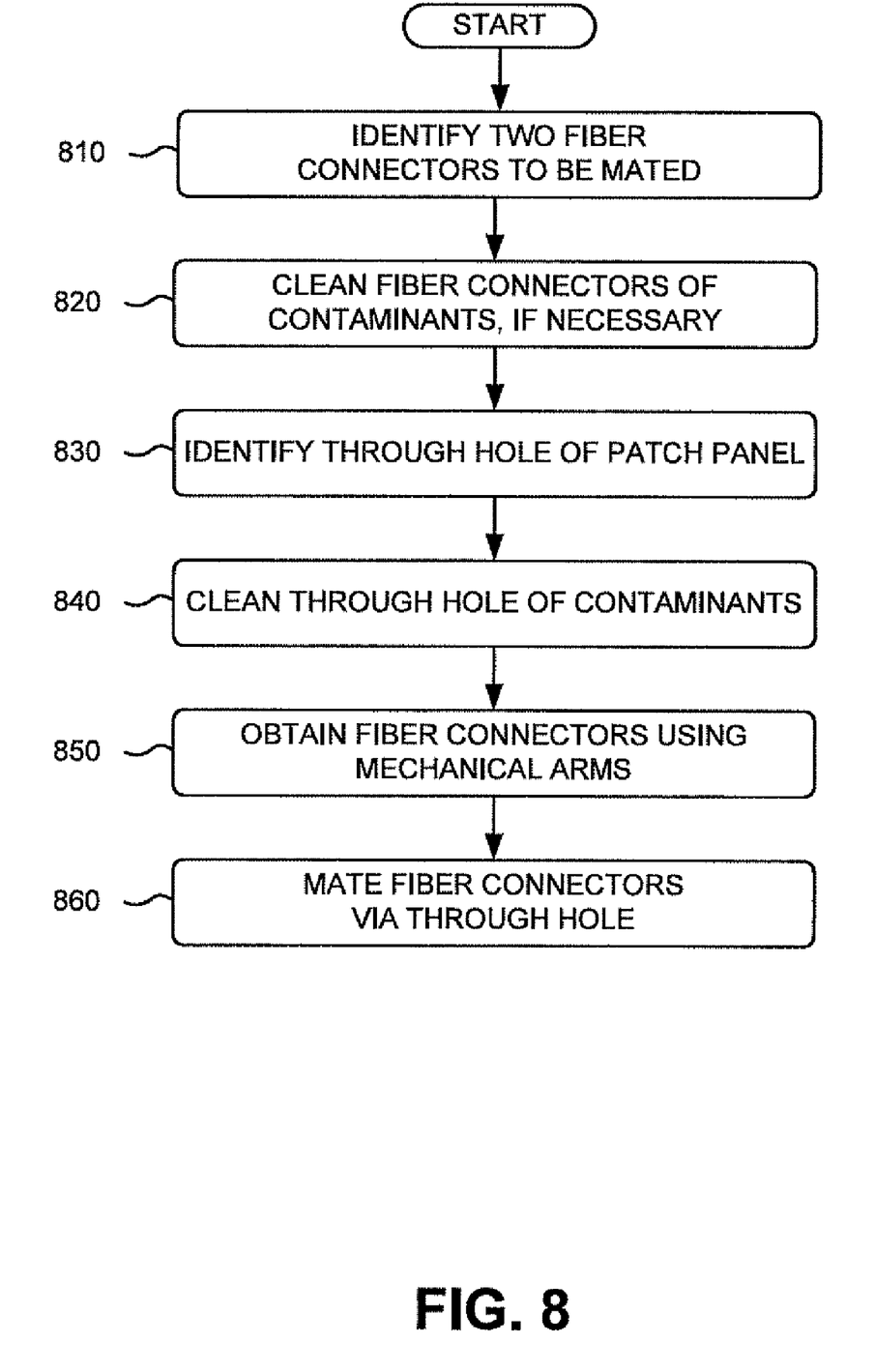
FIG. 8 is a flowchart illustrating an exemplary process for mating two fiber connectors via the patch panel.

FIG. 8 is a flowchart illustrating an exemplary process for mating two fiber connectors 210 and 220 via patch panel 230. The process of FIG. 8 may begin with the identification of two fiber connectors 210 and 220 to be mated (block 810). For example, optical device 110 may receive a signal that instructs optical device 110 to connect a first fiber to a second fiber. Optical device 110 may identify a fiber connector 210 associated with the first fiber and a fiber connector 220 associated with the second fiber.

Fiber connectors 210 and 220 may be cleaned of contaminants, if necessary (block 820). For example, an automated technique, such as fiber scoping, may be used to determine the loss associated with fiber connectors 210 and 220. If the loss associated with a fiber connector 210/220 is not greater than a threshold, then that fiber connector 210/220 may not need to be cleaned. The threshold may be set based on performance considerations. A loss of 0.2 dB may be deemed acceptable. Alternatively, a loss in the range of 0.2 dB to 0.5 dB may be deemed acceptable. The threshold may be set based on the amount of loss that can be tolerated to maintain a particular level of performance. In one implementation, the threshold may be set at 0.5 dB, 0.7 dB, or at another threshold value.

If the loss associated with a fiber connector 210/220 is greater than the threshold, then fiber tip cleaning may be performed on fiber connector 210/220. For example, fiber connector cleaner 270 may use cleaning pad 710 (wet or dry) to clean contaminants from fiber tip 320. In one implementation, cleaning pad 710 may be rubbed against fiber tip 320 in a direction perpendicular to the axis of fiber tip 320 for a particular number of iterations to clean contaminants from fiber tip 320. The particular number of iterations may be programmable. Alternatively, the particular number of iterations may be based on loss associated with fiber connector 210/220. For example, movement of cleaning pad 710 may continue until the loss associated with fiber connector 210/220 falls below a threshold, which may or may not be the same threshold used to determine whether fiber tip cleaning is necessary.

A through hole 410 of patch panel 230 may be identified to receive fiber connectors 210 and 220 (block 830). For example, optical device 110 may use software to identify available through holes 410 of patch panel 230. Optical device 110 may determine which of the available through holes 410 should be used to receive fiber connectors 211 and 220. In one implementation, optical device 110 may randomly select one of the available through holes 410, or may select one of the available through holes 410 according to some pattern.

Through hole 410 may be cleaned of contaminants (block 840). For example, patch panel cleaner 260 may use air blower 510 and/or stick cleaner 610 to clean contaminants from within through hole 410. For example, air blower 510 may be positioned next to through hole 410 using, for example, a robotic arm. Air blower 510 may then blow air into through hole 410 with a particular amount of force and for a particular amount of time to clean contaminants from within through hole 410. The particular amount of force and/or the particular amount of time may be programmable. Alternatively, or additionally, stick cleaner 610 may be positioned next to through hole 410 using, for example, a robotic arm. Stick cleaner 610 may then be inserted into through hole 410 and moved in a particular direction/motion (e.g., back and forth, circular, etc.) to clean contaminants from within the selected through hole 410. The particular direction/motion may be programmable.

Fiber connectors 210 and 220 may be obtained using robotic arms 240 and 250, respectively (block 850). For example, robotic arms 240 and 250 may pick up fiber connectors 210 and 220, respectively, from one or more locations containing unused fiber connectors 210 and 220.

Figure 9:
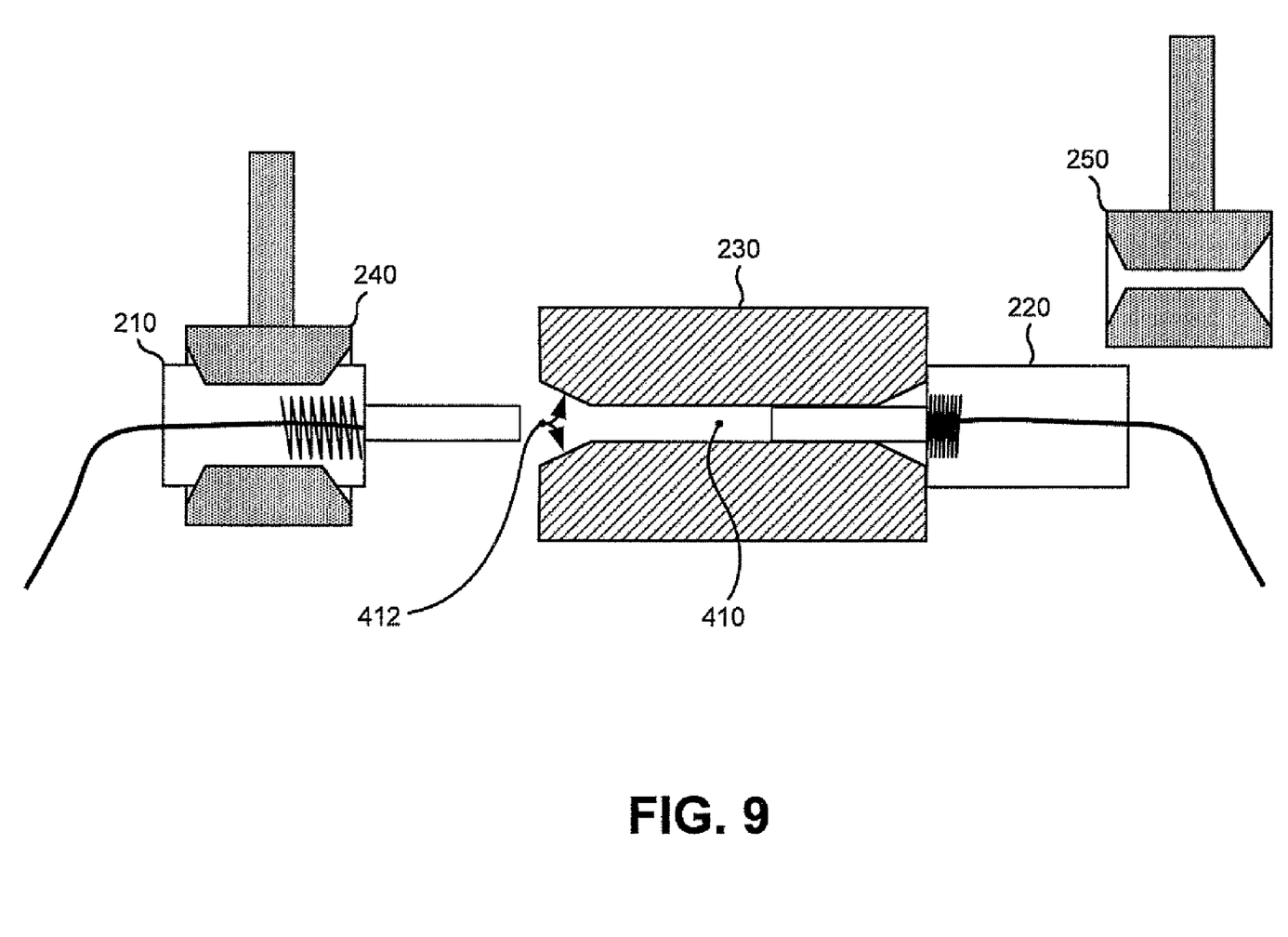
FIG. 9 is a diagram illustrating the mating of two fiber connectors via the patch panel.

Fiber connectors 210 and 220 may be mated via through hole 410 (block 860). For example, optical device 110 may instruct robotic arms 240 and 250 regarding which through hole 410 to use to mate fiber connectors 210 and 220. Robotic arms 240 and 250 may guide fiber connectors 210 and 220, respectively, toward through hole 410 and seat fiber connectors 210 and 220 within through hole 410, as shown in FIG. 9. Angled slants 412 may facilitate proper guiding and seating of fiber connectors 210 and 220.

The preceding description described the patch panel cleaning process and/or the fiber connector cleaning process as part of the process for mating two fiber connectors. In another implementation, the patch panel cleaning process and/or the fiber connector cleaning process may be performed independent of the process for mating two fiber connectors.

For example, the patch panel cleaning process may be performed on a periodic basis (e.g., repeated at particular time intervals) or may be continuously performed (e.g., continuously cleaning through holes 410 of patch panel 230). In this case, patch panel cleaner 260 may select an available through hole 410 (i.e., a through hole 410 that is empty) to clean. For example, an available through hole 410 may be selected as a function of when this through hole 410 was last cleaned. This may ensure that through holes 410 are periodically cleaned (i.e., through holes 410 that have not been cleaned in more than a particular amount of time or that have not been cleaned since their last use may be given a higher priority in the cleaning process). This may also ensure that through holes 410 are not needlessly cleaned (i.e., through holes 410 that were recently cleaned or remained empty since the last cleaning may be given a lower priority in the cleaning process). Patch panel cleaner 260 may clean the selected through hole 410, as described above.

Alternatively, or additionally, the fiber connection cleaning process may be performed on a periodic basis (e.g., repeated at particular time intervals) or may be continuously performed (e.g., continuously cleaning fiber connectors 210/220). In this case, fiber connector cleaner 270 may select a fiber connector 210/220, such as any fiber connector 210/220 that is currently not in use (i.e., not mated within patch panel 230). Fiber connector cleaner 270 may perform loss checking on the selected fiber connector 210/220 and clean the selected fiber connector 210/220, if necessary, as described above.

Implementations described herein may provide an arrangement for an optical device that facilitates the cleaning and maintaining of the optical device.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 8, the order of the blocks may be modified in other implementations. Further, non-dependent blocks may be performed in parallel.

Further, it may be possible to provide power to patch panel cleaner 260 and/or fiber connector cleaner 270 independent of other components of optical device 110. In this case, patch panel cleaner 260 and/or fiber connector cleaner 270 may continue to operate if optical device 110 loses power.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An automated method, comprising:
 identifying a fiber connector;
 identifying a through hole of a patch panel to receive the fiber connector;
 cleaning the through hole;
 seating the fiber connector within the through hole after cleaning the through hole;
 determining a loss associated with the fiber connector; and
 cleaning the fiber connector when the loss associated with the fiber connector is greater than a first threshold, including:
  repeatedly rubbing a cleaning pad against the fiber connector to remove contaminants until the loss associated with the fiber connector falls below a second threshold.

2. The method of claim 1, where cleaning the through hole includes:
 guiding an air blower to the through hole, and blowing air through the through hole using the air blower to remove contaminants from the through hole.

3. The method of claim 1, where at least one of an amount of force used to blow the air or an amount of time that the air is blown through the through hole is programmable.

4. The method of claim 1, where cleaning the through hole includes:
 guiding a stick cleaner to the through hole,
 inserting the stick cleaner into the through hole, and
 moving the stick cleaner in a particular direction or with a particular motion to remove contaminants from the through hole.

5. The method of claim 4, where a number of iterations in which the stick cleaner is moved in the particular direction or with the particular motion is programmable.

6. The method of claim 1, where seating the fiber connector includes:
 picking up the fiber connector using a robotic arm,
 guiding, using the robotic arm, the fiber connector to the through hole, and
 seating, using the robotic arm, the fiber connector within the through hole.

7. A device, comprising:
 means for identifying a connector;
 means for determining a loss associated with the connector;
 means for cleaning the connector when the loss associated with the connector is greater than a first threshold;
 means for continuing cleaning of the connector until the loss associated with the connector falls below a second threshold;
 means for identifying a through hole of a patch panel to receive the connector;
 means for cleaning the through hole; and
 means for seating the connector within the through hole after cleaning the through hole.

8. The device of claim 7, where the connector comprises a male fiber connector.

9. The device of claim 7, where the connector includes a spring for forced contact of the connector to the patch panel.

10. The device of claim 7, where the through hole includes an angled slant to facilitate seating of the connector within the through hole.

11. The device of claim 7, where the means for seating comprises:
   a robotic arm to:
      guide the connector to the through hole of the patch panel, and
      seat the connector within the through hole.

12. The device of claim 7, where the means for cleaning the through hole includes an air blower to blow air through the through hole to remove contaminants from the through hole.

13. The device of claim 12, further comprising a robotic arm to move the air blower to the through hole.

14. The device of claim 7, where the means for cleaning the through hole includes a stick cleaner that is automatically inserted into the through hole to remove contaminants from the through hole.

15. The device of claim 14, further comprising a robotic arm to insert the stick cleaner into the through hole.

16. The device of claim 7, where the means for cleaning the connector includes a cleaning pad to automatically remove contaminants from the connector.

* * * * *